UNITED STATES PATENT OFFICE.

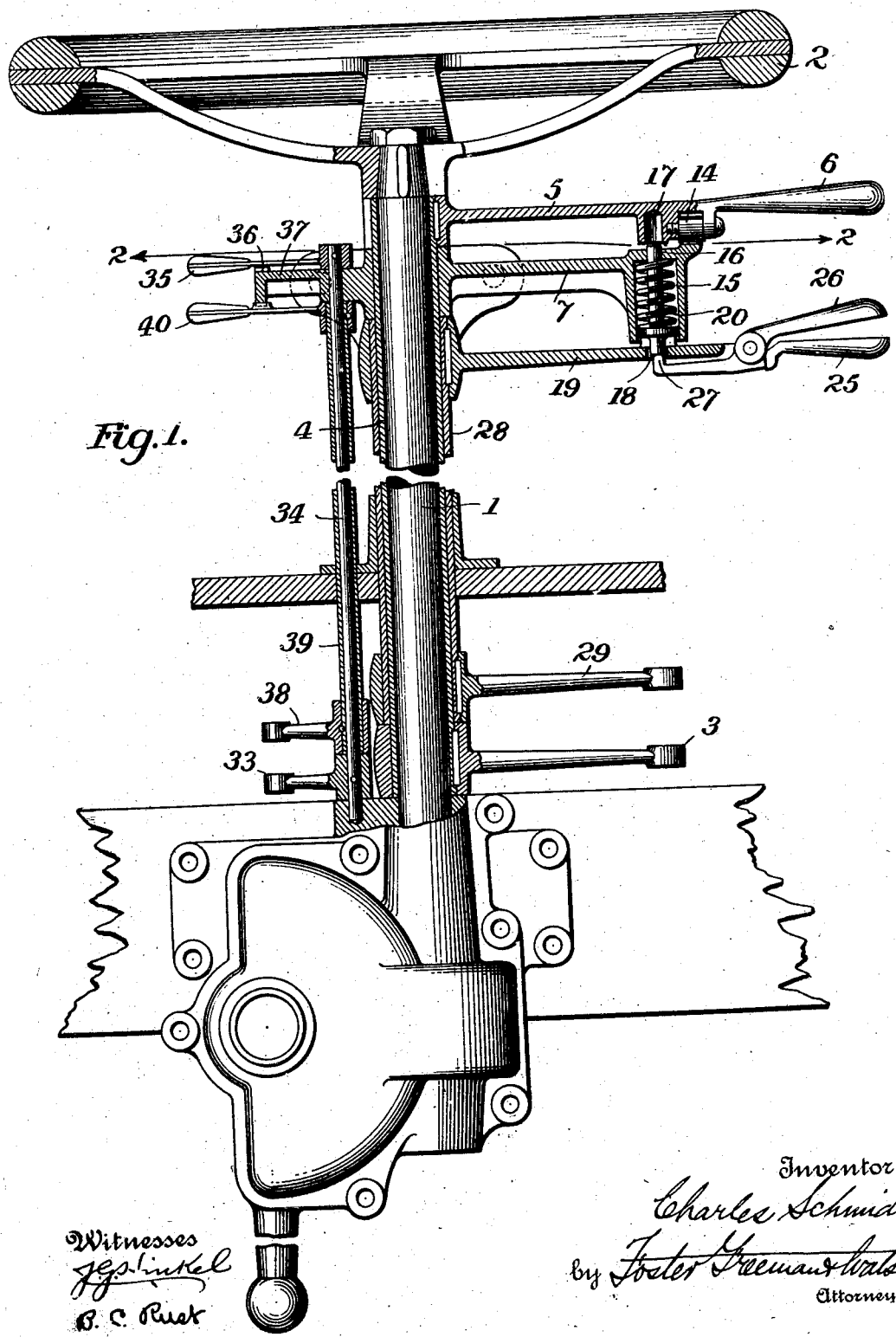

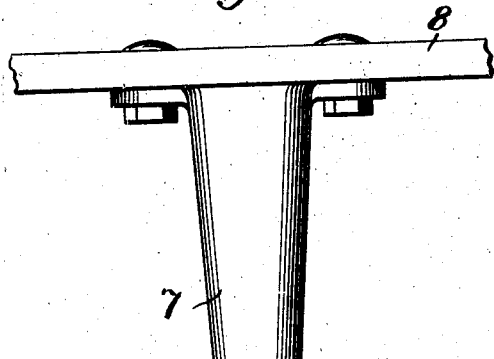
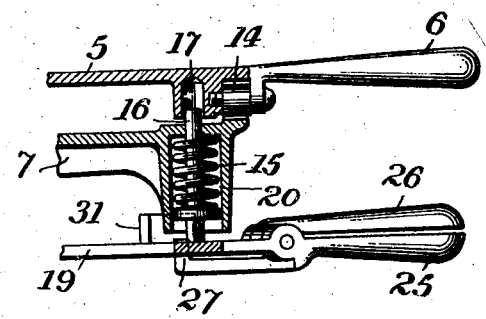
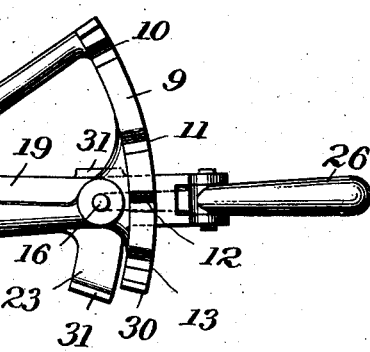
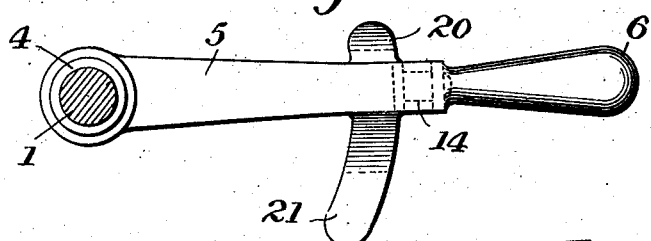
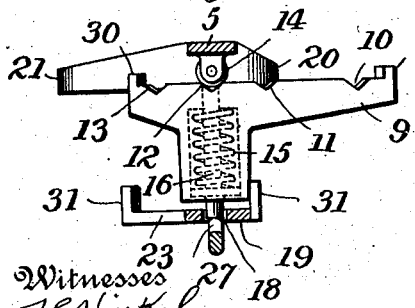
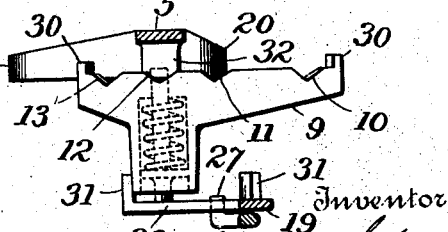

CHARLES SCHMIDT, OF CLEVELAND, OHIO, ASSIGNOR, BY MESNE ASSIGNMENTS, TO PACKARD MOTOR CAR COMPANY, OF DETROIT, MICHIGAN, A CORPORATION OF MICHIGAN.

CONTROLLING MECHANISM FOR MOTOR-VEHICLES.

994,428.  Specification of Letters Patent.  Patented June 6, 1911.

Application filed October 12, 1905.  Serial No. 282,512.

*To all whom it may concern:*

Be it known that I, CHARLES SCHMIDT, a citizen of the Republic of France, and resident of Cleveland, Cuyahoga county, State of Ohio, have invented certain new and useful Improvements in Controlling Mechanism for Motor-Vehicles, of which the following is a specification.

My present invention relates to a controlling mechanism for motor vehicles which is conveniently located in connection with the steering means.

The invention will be described in connection with the accompanying drawings, in which, Figure 1 is a longitudinal sectional view through the steering column or shaft of a motor vehicle provided with my invention; Fig. 2 is a section on the line 2—2 of Fig. 1; Fig. 3 is similar to a portion of Fig. 1, but showing the parts in another position; Fig. 4 is a plan view of the change speed lever; and Figs. 5 and 6 are details.

Referring to the drawings, 1 indicates the steering shaft of a motor vehicle, the upper end of which is provided with the usual steering handle 2 and the lower end of which is connected by suitable gearing with the steering wheels. This connection does not form a part of the present invention and need not be referred to in detail.

I arrange conveniently about the steering shaft the levers or handles for controlling the change-speed gears, the throttle, the spark, and the reverse gear. The change-speed gears are adjusted by means of an arm 3 carried at the lower end of a hollow shaft 4 surrounding the steering shaft 1. At the upper end of the shaft 4 is a controlling arm 5 provided with a handle 6. The hollow shaft 4 has a bearing in a bracket 7 which is secured to the dash board 8 of the vehicle. On the bracket 7 is a sector 9 having notches 10, 11, 12, 13, corresponding to the positions of the arm 5 for the several speeds and the neutral position, in which the gears are disconnected. As shown in Figs. 1, 3 and 5, the arm 5 is provided with a roller 14 adapted to coöperate with the notches to hold the arm in any desired position. The arm is sufficiently flexible to permit the roller to ride from one notch to the other.

In the bracket 7 adjacent to the sector 9 is a pocket 15, in which there is a vertically movable pin or plunger 16. The upper end of the pin is adapted to enter a socket 17 in the arm 5, while the lower end is adapted to enter an opening 18 in the arm 19 which operates the reverse gear. A spring 20 surrounding the pin 16 tends normally to press said pin downwardly and into the opening 18 when said opening registers with the pin. The arm 5 is provided with wing-like guards 20, 21, which prevent the pin 16 from rising, excepting when the opening 17 registers with it. Likewise the arm 19 is provided with a wing-like guard 23, which prevents the pin from dropping out of the socket 17 excepting when the opening 18 registers with the pin. The reversing lever 19 is provided with a handle 25 and with a small hand lever 26 having an up-turned point 27 adapted to pass into the opening 18 to raise the pin 16. The arm 19 is mounted on a hollow shaft 28 surrounding the shaft 4 and the lower end of shaft 28 is provided with an arm 29 which is suitably connected with the backing gear for throwing the same into and out of mesh, in the usual manner.

The operation of the parts described is as follows: The reverse lever 19 is normally held in its neutral position, illustrated in Figs. 1 and 2, by means of the pin 16 and the change-speed arm 5 is normally free to be moved to shift the gears for different speeds. When it is desired to reverse the direction of the vehicle by throwing in the backing gear, the change-speed lever 5 must first be brought to its neutral position, illustrated in Figs. 1 and 3. The arms or levers 5 and 19 being both in neutral position, the pin 16 may be raised by the lever 26 to engage it with the arm 5 and free it from the arm 19. The reverse arm 19 may then be turned to throw in the backing gear and when so turned its guard 23 prevents the pin 16 from releasing the arm 5. It will be evident that the arms 5 and 19 are so interlocked that each must be locked in neutral position while the other is operative.

In Figs. 5 and 6, the guards 20, 21 and 23 and the sector 9 are shown in side view. It will be observed that the sector has projections 30 at its ends to limit the movement of the arm 5 and that the guard 23 has projections 31 to limit the movement of the arm 19. In Fig. 6 the arm 5 is shown locked in neutral position and the arm 19 in the position in which the reverse gear is operating. In this figure also a tooth 32 is substituted for friction roll 14.

Referring to Figs. 1 and 2, 33 indicates an arm which is suitably connected to control the throttle of the motor. This arm is fixed on a shaft 34 and adjusted by means of a handle 35 on the upper end of said shaft. The handle 35 is arranged to engage a toothed segment 36, whereby it may be automatically locked in any desired position, the sector being formed on an arm 37 of the bracket 7. Adjacent to the arm 33 is an arm 38 for controlling the spark. This arm is mounted on a hollow shaft 39, upon the upper end of which is an operating arm 40 which engages teeth on the under surface of the sector 36.

It will be seen that the four operating levers are very conveniently located about the steering shaft near its handle. They are all mounted upon a common bracket, which bracket also serves to support the dash board and the steering shaft.

Having described my invention what I claim and desire to secure by Letters Patent is, 1. In a motor vehicle, the combination with a fixed bracket, of two levers arranged on opposite sides of the bracket, a part carried by the bracket and adapted to interlock with each lever, and means for normally holding said part in engagement with one of said levers, whereby the other lever is normally free.

2. In a motor vehicle, the combination with a fixed bracket, of two levers arranged on opposite sides of the bracket, a part carried by the bracket and adapted to interlock with each lever, and means carried by one of said levers and movable independently thereof for shifting said interlocking part.

3. In a motor vehicle, the combination with a fixed bracket, of two levers arranged on opposite sides of the bracket, a part carried by the bracket and adapted to interlock with each lever, a spring for moving said interlocking part normally toward one of said levers, and means for shifting said part positively against the tension of the spring to release said lever.

4. In a motor vehicle, the combination with a fixed bracket and a steering shaft having a bearing in said bracket, of two arms arranged respectively above and below said bracket and adapted to swing around said steering shaft, a part movably mounted in said bracket and adapted to interlock with either of said arms when the latter are in a middle or neutral position, a spring for normally pressing said part toward one of said arms, and means carried by the last mentioned arm for releasing it from the said interlocking part.

5. In a motor vehicle, the combination of two movable arms for shifting respectively the change-speed gears and the backing gear, a fixed part or bracket between said arms, a movable part mounted in said bracket and adapted to engage with either of said arms when in their neutral position, a spring for normally pressing said part into engagement with the arm for operating the backing gear, and means for yieldingly holding the arm for shifting the change-speed gears in any one of several positions.

In testimony whereof I have signed my name to this specification in the presence of two subscribing witnesses.

CHARLES SCHMIDT.

Witnesses:
H. R. SULLIVAN,
W. L. McGARRELL.

---

Copies of this patent may be obtained for five cents each, by addressing the "Commissioner of Patents, Washington, D. C."